United States Patent
Ahn et al.

(10) Patent No.: US 8,517,552 B2
(45) Date of Patent: Aug. 27, 2013

(54) OPTICAL FILM AND LIGHT EMITTING DEVICE USING THE SAME

(75) Inventors: Young Joo Ahn, Seoul (KR); Jongchan Park, Seoul (KR); Young Jin Kim, Seoul (KR); AnNa Han, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 390 days.

(21) Appl. No.: 12/906,572

(22) Filed: Oct. 18, 2010

(65) Prior Publication Data

US 2011/0090670 A1    Apr. 21, 2011

(30) Foreign Application Priority Data

| Oct. 19, 2009 | (KR) | ......................... 10-2009-0099292 |
| Oct. 19, 2009 | (KR) | ......................... 10-2009-0099293 |
| Oct. 19, 2009 | (KR) | ......................... 10-2009-0099294 |
| Apr. 10, 2010 | (KR) | ......................... 10-2010-0033023 |

(51) Int. Cl.
*F21V 9/16* (2006.01)

(52) U.S. Cl.
USPC ........ 362/84; 362/260; 362/311.03; 362/618; 362/627; 349/62

(58) Field of Classification Search
USPC ............ 349/62, 64, 65; 362/84, 260, 311.03, 362/330, 355, 618, 627; 428/41.8, 215, 332, 428/354
See application file for complete search history.

(56) References Cited

U.S. PATENT DOCUMENTS

| 5,387,458 | A  |    | 2/1995 | Pavelka et al. ................. 428/141 |
| 7,710,512 | B2 | *  | 5/2010 | Lee ................................. 349/64 |
| 8,210,701 | B2 | *  | 7/2012 | Igarashi et al. .......... 362/311.03 |
| 2002/0015836 | A1 |  | 2/2002 | Jonza et al. |

FOREIGN PATENT DOCUMENTS

| EP | 1 418 628 A1 | 5/2004 |
| JP | 2002-192867 A | 7/2002 |
| JP | 2008-287073 A | 11/2008 |
| KR | 10-2009-0089698 A | 8/2009 |
| KR | 10-2009-0093324 A | 9/2009 |
| KR | 10-2010-0029854 A | 3/2010 |
| WO | WO 02/08664 A1 | 1/2002 |

OTHER PUBLICATIONS

Korean Notice of Allowance dated Aug. 22, 2012 issued in Application No. 10-2010-0032157.
European Search Report dated Apr. 2, 2013.

* cited by examiner

*Primary Examiner* — Stephen F Husar
(74) *Attorney, Agent, or Firm* — KED & Associates, LLP

(57) ABSTRACT

The optical film may include a base film including a material having optical transmittance and a thermal resistance, a matrix layer disposed on the base film which may include a fluorescent material, and a protective layer disposed on the matrix layer and which may include a material having adhesive property.

21 Claims, 9 Drawing Sheets

| COLOR TEMPERATURE (K) | FLUORESCENT MATERIAL (UNIT :WT%) | |
|---|---|---|
| | R | G |
| 3000 | 30~40 | 30~40 |
| 4000 | 15~25 | 15~25 |
| 5000 | 5~15 | 8~18 |

US 8,517,552 B2

OPTICAL FILM AND LIGHT EMITTING DEVICE USING THE SAME

The present application claims priority under 35 U.S.C. §119(e) of Korean Patent Applications Nos. 10-2009-0099292, 10-2009-0099293 and 10-2009-0099294 filed on Oct. 19, 2009 and 10-2010-0033023 filed on Apr. 10, 2010, which is hereby incorporated by reference in its entirety.

BACKGROUND

1. Field

This embodiment relates to a lighting device.

2. Description of the Related Art

A light emitting diode (hereinafter, referred to as LED) is a semiconductor element for converting electric energy into light. As compared with existing light sources such as a fluorescent lamp and an incandescent electric lamp and so on, the LED has advantages of low power consumption, a semi-permanent span of life, a rapid response speed, safety and an environment-friendliness. For this reason, many researches are devoted to substitution of the existing light sources with the LED. The LED is now increasingly used as a light source for lighting devices, for example, various lamps used interiorly and exteriorly, a liquid crystal display device, an electric sign and a street lamp and the like.

SUMMARY

One embodiment is an optical film. The optical film includes:
  a base film including a material having optical transmittance and a thermal resistance;
  a matrix layer disposed on the base film and comprising a fluorescent material; and
  a protective layer disposed on the matrix layer and including a material having adhesive property.

Another embodiment is an optical film. The optical film includes:
  a base film having a thickness between about 10 μm and about 500 μm;
  a matrix layer disposed on the base film and comprising a fluorescent material and having a thickness between about 20 μm and about 500 μm; and
  a protective layer having an optical transmittance on about 80% and/or a viscosity between about 2,000 cp and about 10,000 cp disposed on the matrix layer.

Further another embodiment is an optical film. The optical film includes:
  a light emitting chip; and
  an optical film including at least one sort of a fluorescent material excited by light emitted from the light emitting chip, wherein light passing through the optical film has a color rendering index (CRI) between 85 and 100.

DETAILED DESCRIPTION OF THE EMBODIMENTS

Hereinafter, an embodiment will be described in detail with reference to the accompanying drawings.

It will be understood that when an element is referred to as being 'on' or "under" another element, it can be directly on/under the element, and one or more intervening elements may also be present

First Embodiment

Figure 1:
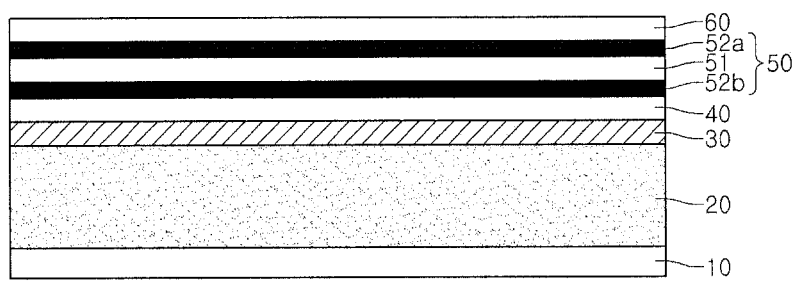
FIG. 1 is a cross sectional view of an optical film according to a first embodiment.

FIG. 1 is a cross sectional view of an optical film 1 according to a first embodiment.

Referring to FIG. 1, the optical film 1 includes a base film 10, a matrix layer 20 on the base film 10, a protective layer 30 on the matrix layer 20, a protective film 40 on the protective layer 30, an adhesive member 50 on the protective film 40 and a release film 60 on the adhesive member 50.

The matrix layer 20 includes a fluorescent material. The fluorescent material is excited by a first light emitted by a light source and emits a second light.

That is, the optical film 1 has a function capable of changing the wavelength of light emitted from the light source and externally emitting the light.

Therefore, the optical film 1 is applied to light sources of various lighting devices, a backlight unit, a light emitting element, a display device and the like and is used to generate light having various wavelengths or to improve a color rendering index (CRI) of the light source.

Hereinafter, components of the optical film 1 will be described in detail.

It is desired that the base film 10 is made of a resin material having an excellent optical transmittance and a thermal resistance. For example, the base film 10 is made of materials selected from a group consisting of polyethylene terephthalate (PET), polyethylene naphthalate (PEN), an acrylic resin, polycarbonate (PC), polystyrene (PS) and polymethyl methacrylate (PMMA), etc.

More specifically, the material of the base film 10 is determined based on the use of the optical film 1. For example, if a high optical transmittance is required, the PET having an optical transmittance over 90% can be used. If a thermal resistance and chemical resistance are required, the base film 10 can be made of polycarbonate. However, there is no limit to the material of the base film 10.

The base film 10 has a thickness within a range, for example, between 10 μm and 500 μm, and preferably, between 20 μm and 30 μm. Because while the base film 10 having a thickness between 10 μm and 500 μm is easy to handle and has an excellent optical transmittance, base film 10 having a thickness between 20 μm and 30 μm is easier to handle and has a more excellent optical transmittance. However, there is no limit to the thickness of the base film 10.

The matrix layer 20 is formed on the base film 10.

It is desired that the matrix layer 20 is made of a material having an excellent optical transmittance, a viscosity, a curing temperature and so on because the optical film 1 may be applied to a light source emitting light at the high temperature and is required to maintain the excellent optical transmittance, a viscosity and hardness even at a high temperature.

More specifically, since the matrix layer 20 has an optical transmittance over 80%, is cured at a temperature lower than 120° C. and has a viscosity over 3,000 cp, the matrix layer 20 can be made of a material more adhesive to the base film 10. For example, the matrix layer 20 is made of at least one of a resin material and a silicon material, preferably, the silicone resin.

The matrix resin film 20 has a thickness within a range between 20 μm and 500 μm, and preferably, between 30 μm and 50 μm. The matrix layer 20 having such a thickness allows the following fluorescent material, a diffusing agent and an antifoaming agent to be easily mixed therewith, allows light to stably transmit and is readily applied on the base film 10.

The matrix layer 20 includes a fluorescent material. The fluorescent material is, for example, mixed with the liquefied matrix layer 20 and is agitated by using an agitator. As such, the fluorescent material is included in the matrix layer 20.

The fluorescent material is excited by a first light emitted by a light source and emits a second light. For example, at least one of a silicate based material, a sulfide based material, a YAG series and a TAG based material is used as the fluorescent material.

The fluorescent material is excited by the first light emitted from a light source and includes at least one of yellow, red, green and blue fluorescent materials, each of which emits yellow, red, green and blue lights respectively. There is no limit to the kind of the fluorescent material.

Meanwhile, CaS:Eu that is a kind of inorganic fluorescent material of the sulfide based material is representatively used to emit deep red light. At least one of SrS:Eu and MgS:Eu of the sulfide based material is used as an orange color fluorescent material. $SrGa_2S_4:Eu_2+$ of the sulfide based material is used as a green fluorescent material.

The matrix layer 20 includes the fluorescent materials having various kinds and amounts in accordance with a light source to which the optical film 1 is applied.

For example, when the optical film 1 is applied to white light source, the matrix layer 20 includes green and red fluorescent materials. With respect to 100 weight percent of the matrix layer 20, the matrix layer 20 includes 1 to 60 weight percent of the green fluorescent material and 1 to 60 weight percent of the red fluorescent material.

In addition, when the optical film 1 is applied to blue light source, the matrix layer 20 includes green, yellow and red fluorescent materials. With respect to 100 weight percent of the matrix layer 20, the matrix layer 20 includes 1 to 60 weight percent of the green fluorescent material, 1 to 60 weight percent of the yellow fluorescent material and 1 to 60 weight percent of the red fluorescent material.

As such, the kind and amount of the fluorescent material included in the matrix layer 20 varies depending on the kind of a light source. There is no limit to the kind and amount of the fluorescent material.

Meanwhile, the matrix layer 20 further includes at least one of the diffusing agent, the antifoaming agent, an additive and a curing agent.

The diffusing agent scatters and diffuses light incident on the matrix layer 20. The diffusing agent includes, for example, at least one of $SiO_2$, $TiO_2$, ZnO, $BaSO_4$, $CaSO_4$, $MgCO_3$, $Al(OH)_3$, synthetic silica, glass beads and diamond. However, there is no limit to the kind of the diffusing agent.

The particle of the diffusing agent is determined to have an appropriate size for diffusion of light, for example, a diameter of from 5 μm to 7 μm.

The antifoaming agent removes the foams in the matrix layer 20 and improves the reliability of the optical film 1. Particularly, the antifoaming agent is able to solve the problem of the foams generated during the process of applying the matrix layer 20 on the base film 10 by a screen printing method.

The antifoaming agent includes at least one of octanol, sikeulroheksanol, ethylene glycol or various surface active agents. However, there is no limit to the kind of the antifoaming agent.

The curing agent cures the matrix layer 20. The additive is used for uniformly dispersing the fluorescent material in the matrix layer 20.

The protective layer 30 is formed on the matrix layer 20.

The protective layer 30 is made of a resin material or/and a silicon material having an excellent optical transmittance, a thermal resistance and adhesiveness.

In particular, it is desired that the protective layer 30 is made of a material more adhesive to the protective film 40 formed on the protective layer 30. For example, the protective layer 30 is formed of a silicone resin having an optical transmittance over 80%, an excellent thermal resistance and adhesiveness.

The protective layer 30 has a thickness within a range, for example, between 20 μm and 50 μm. However, there is no limit to the thickness of the protective layer 30.

If the protective film 40 is formed directly on the matrix layer 20, there is an insufficient adhesive strength between the matrix layer 20 and the protective film 40. As a result, the two layers are separated from each other and water permeates a space between the two layers. This may be a factor causing the reliability of the optical film to be degraded.

Accordingly, in the embodiment, the protective layer 30 is formed between the matrix layer 20 and the protective film 40, allowing the matrix layer 20 to be strongly adhered to the protective film 40 and improving the reliability of the optical film 1.

More specifically, first, the protective layer 30 in a B-stage state is applied on the matrix layer 20. Then after the protective film 40 is adhered on the protective layer 30 in a B-stage state, the protective layer 30 is cured. Consequently, the protective film 40 is securely adhered on the protective layer 30 and the reliability of the optical film 1 is improved.

Moreover, when the protective layer 30 is formed in the same manner as that of the embodiment, there is an effect of protecting the fluorescent material included in the matrix layer 20. That is, the protective layer 30 performs a function of mitigating the transfer of the heat generated by the light source to the fluorescent material, allowing the fluorescent material to be less degraded by the heat. Particularly, since red fluorescent material is generally vulnerable to heat, it is possible to more surely protect the fluorescent material by means of the protective layer 30.

The protective film 40 is formed on the protective layer 30. The protective film 40 protects the matrix layer 20, improving the reliability of the optical film 1.

The protective film 40 is made of the same material as that of the base film 10. For example, the protective layer 40 is made of materials selected from a group consisting of polyethylene terephthalate (PET), polyethylene naphthalate (PEN), an acrylic resin, polycarbonate (PC), polystyrene (PS) and polymethyl methacrylate (PMMA), etc.

In addition, the protective film 40 has a thickness within a range, for example, between 10 µm and 500 µm, and preferably, 25 µm.

The adhesive member 50 is formed on the protective film 40.

The adhesive member 50 includes a body layer 51, a first adhesive layer 52a and a second adhesive layer 52b.

The second adhesive layer 52b is formed between the body layer 51 and the protective film 40 and allows the two layers to be adhered to each other.

Additionally, the first adhesive layer 52a is formed on the body layer 51 and allows the optical film 1 to be adhered to an external light source.

The adhesive member 50 can be separately provided and adhered to the protective film 40. Otherwise, the adhesive member 50 can be formed by stacking the second adhesive layer 52b, the body layer 51 and the first adhesive layer 52a in the order specified. There is no limit to a method of forming the adhesive member 50. When the adhesive member 50 is not required, the adhesive member 50 may not be formed. There is no limit to a method of forming the adhesive member 50.

The release film 60 is formed on the adhesive member 50. The release film 60 prevents the first adhesive layer 52a from being dried by air, etc., and from losing the adhesive strength. After removing the release film 60, the optical film 1 is adhered to a light source and the like.

Hereinafter, a method for fabricating the optical film 1 will be described in detail. However, the repetitive description of the foregoing description will be briefly described or omitted.

Figure 7:
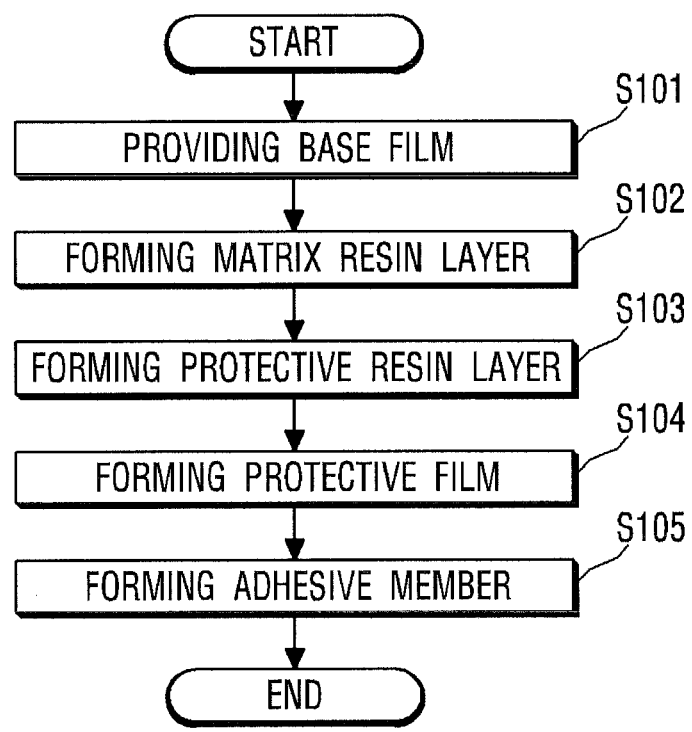
FIG. 7 is a flowchart showing a method for fabricating the optical film according to the first embodiment.

FIGS. 2 to 5 show a method for fabricating the optical film 1. FIG. 7 is a flowchart showing a method for fabricating the optical film 1.

Figure 2:
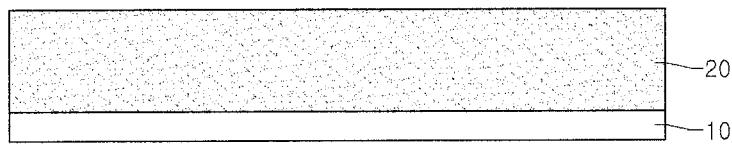
FIGS. 2 to 5 are views for describing a method fabricating for the optical film according to the first embodiment.

Referring to FIG. 2, the base film 10 is provided (S101 of FIG. 7). The matrix layer 20 is formed on the provided base film 10 (S102 of FIG. 7).

The material and size of the base film 10 is determined according to the kind of a light source to which the optical film 1 is applied.

The matrix layer 20 is formed on the base film 10. The matrix layer 20 is formed, for example, by forming a liquefied matrix resin formed through the mixture and agitation of a silicone resin and a fluorescent material and by applying the liquefied matrix resin on the base film 10.

The matrix layer 20 is formed, for example, by applying and curing the liquefied matrix resin on the base film 10 through use of a screen printing method, a slit coating method and a roll coating method, etc. The matrix layer 20 is dried and cured at a temperature of about 100° C. by using a microwave and an infrared drier, etc., or is cured by adding the curing agent.

Figure 3:
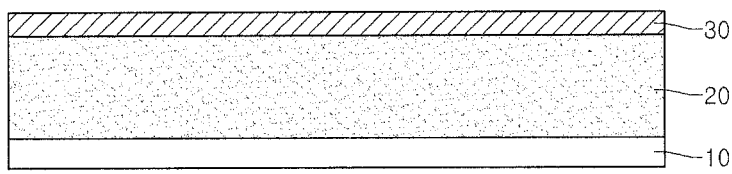
Figure 4:
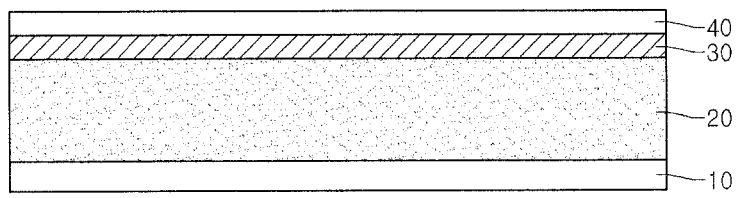

Referring to FIGS. 3 and 4, the protective layer 30 is formed on the matrix layer 20 (S103 of FIG. 7). The protective film 40 is formed on the protective layer 30 (S104 of FIG. 7).

The protective layer 30 in a B-stage state is applied on the matrix layer 20. Then after the protective film 40 is adhered on the protective layer 30 in a B-stage state, the protective layer 30 is cured. Consequently, the protective film 40 is securely adhered on the protective layer 30 and the reliability of the optical film 1 is improved.

The protective layer 30 is cured by adding the curing agent or is dried at a temperature of about 100° C. by using a microwave and an infrared drier, etc.

The protective layer 30 is made of a resin material or/and a silicon material having an excellent optical transmittance, a thermal resistance and adhesiveness. The protective layer 30 has a thickness within a range between 20 µm and 50 µm.

The protective film 40 is made of the same material as that of the base film 10. The protective film 40 has a thickness within a range, for example, between 10 µm and 500 µm.

Figure 5:
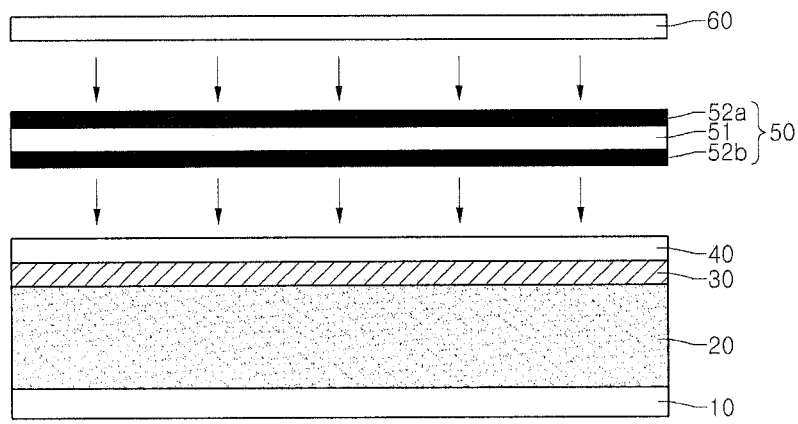

Referring to FIG. 5, the optical film 1 according to the embodiment is provided by forming the adhesive member 50 and the release film 60 on the protective film 40 (S105 of FIG. 7).

The adhesive member 50 can be separately provided and adhered to the protective film 40. Otherwise, the adhesive member 50 can be formed by stacking the second adhesive layer 52b, the body layer 51 and the first adhesive layer 52a in the order specified. There is no limit to a method of forming the adhesive member 50. When the adhesive member 50 is not required, the adhesive member 50 may not be formed. There is no limit to a method of forming the adhesive member 50.

The release film 60 prevents the first adhesive layer 52a from being dried by air, etc., and losing the adhesive strength. After removing the release film 60, the optical film 1 is adhered to a light source and the like.

In the meantime, for the purpose of improving the reliability of the optical film 1, it is possible to perform a post-treatment process of heating the optical film 1 at a temperature of from 50° C. to 100° C. for one hour to twenty four hours.

Second Embodiment

Hereinafter, an optical film 2 according to a second embodiment and a method for fabricating the same will be described in detail. In the description of the second embodiment, repetitive descriptions thereof will be omitted.

Figure 6:
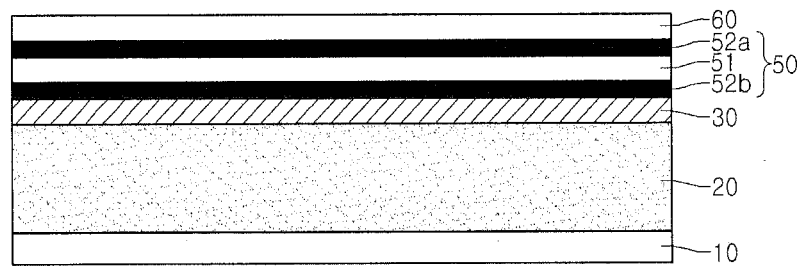
FIG. 6 is a cross sectional view of an optical film according to a second embodiment.

FIG. 6 is a cross sectional view of the optical film according to the second embodiment. The optical film 2 according to the second embodiment is different from the optical film 1 according to the first embodiment in that the optical film 2 does not include the protective film.

Referring to FIG. 6, the optical film 2 includes a base film 10, a matrix layer 20 on the base film 10, a protective layer 30 on the matrix layer 20, an adhesive member 50 on the protective layer 30 and a release film 60 on the adhesive member 50.

The adhesive member 50 is formed directly on the protective layer 30. In other words, the protective film shown in the first embodiment is not formed.

Since the separate protective film is not formed, the protective layer 30 is formed thicker than that of the first embodiment. Therefore, the reliability of the optical film 2 can be obtained. For example, the protective layer 30 has a thickness within a range between 20 µm and 100 µm. There is no limit to the thickness of the protective layer 30.

Third Embodiment

Figure 8:
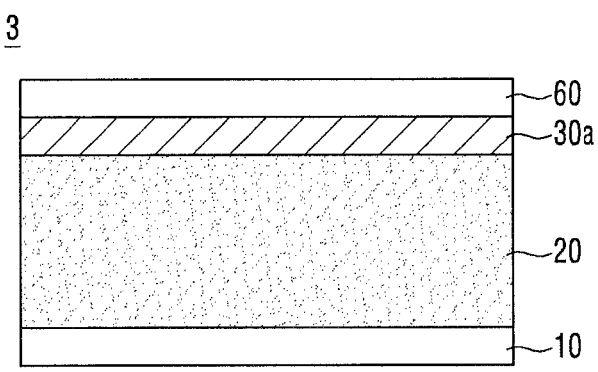
FIG. 8 is a cross sectional view of an optical film according to a third embodiment.

FIG. 8 is a cross sectional view of an optical film 3 according to a third embodiment.

Referring to FIG. 8, the optical film 3 includes a base film 10, a matrix layer 20 on the base film 10, a viscous layer 30a on the matrix layer 20, and a release film 60 on the viscous layer 30a.

Since the base film, the matrix layer and the release film have been already described in the optical film of the first embodiment, descriptions thereabout will be omitted.

The viscous layer 30a is formed on the matrix layer 20. The viscous layer 30a has an excellent optical transmittance and thermal resistance, and particularly is made of a resin material or/and a silicon material having an excellent viscosity.

For example, the viscous layer 30a may be formed of a silicone resin, more preferably, a solvent type silicone resin including toluene. Since the silicone resin including the toluene has not only excellent viscosity but also high optical transmittance, another adhesive member for adhering the optical film 2 to a light source, etc., is not required.

In other words, through the formation of the viscous layer 30a, it is possible to simplify the manufacturing process of the optical film 1, to allow the optical film 2 to be thinner, and to hereby reduce the amount of loss of light transmitting the optical film 2. The optical transmittance of the silicone resin including the toluene may be at least more than 90%, and viscosity of the silicone resin may be between 2,000 cp (centipoises) and 10,000 cp.

Meanwhile, it is preferable that the thickness of the viscous layer 30a is, for example, from 20 μm to 100 μm.

The viscous layer 30a having such a thickness functions to absorb heat which is generated by the light source and is transferred to the fluorescent material included in the matrix layer 20, thus reducing the degradation of the fluorescent material. In particular, since a red fluorescent material is vulnerable to heat, the red fluorescent material can be more clearly protected by the viscous layer 30a.

Regarding the viscous layer 30a including volatile toluene, after the viscous layer 30a is formed in a state of B-stage on the matrix layer 20, the viscous layer 30a can be cured by heating and drying through the use of a microwave, an infrared drier, etc., instead of a separate curing agent. Further, the viscous layer 30a can be cured by adding the curing agent. However, there is no limit to a method of curing the viscous layer 30a.

The release film 60 is formed on the viscous layer 30a. The release film 60 is able to prevent the viscous layer 30a from being exposed to the air, etc., and losing an adhesive strength. The optical film 2 can be adhered to a light source and the like after removing the release film 60.

Hereinafter, a method for fabricating the optical film 3 will be described in detail. However, the repetitive description of the foregoing description will be briefly described or omitted.

Figure 9:
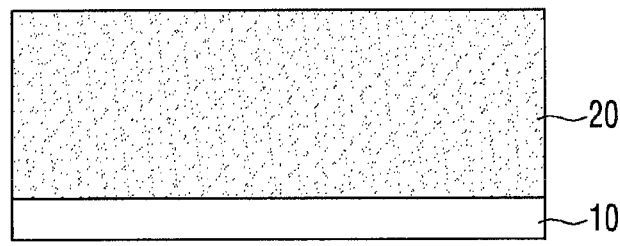
FIGS. 9 to 11 are views for describing a method for fabricating the optical film according to the third embodiment.
Figure 10:
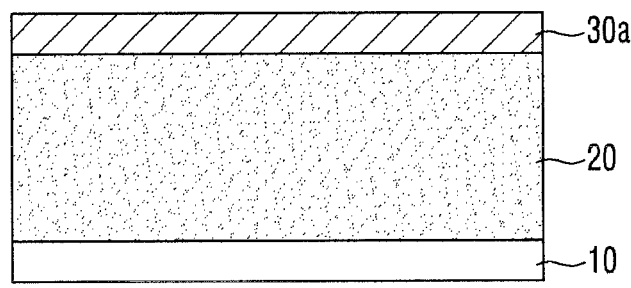
Figure 11:
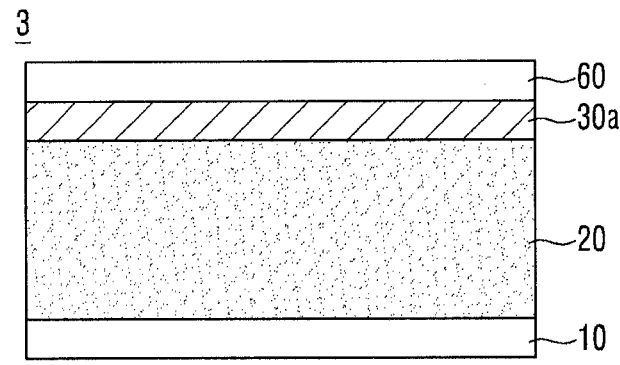
Figure 12:
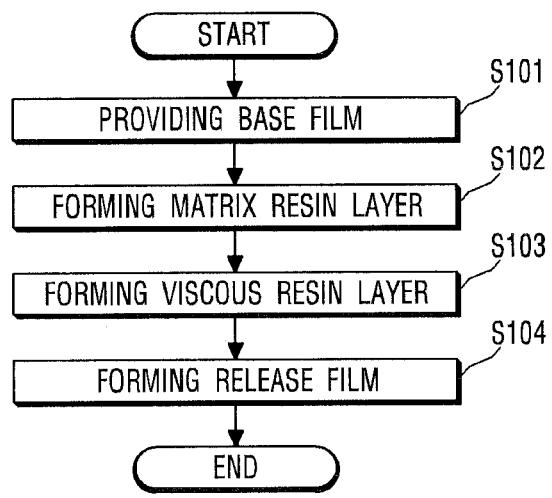
FIG. 12 is a flowchart showing a method fabricating for the optical film according to the third embodiment.

FIGS. 9 to 11 are views for describing a method fabricating for the optical film 3 according to the third embodiment. FIG. 12 is a flowchart showing a method fabricating for the optical film 3.

Referring to FIG. 9, the base film 10 is provided (S101 of FIG. 12). The matrix layer 20 is formed on the base film 10 (S102 of FIG. 12).

The material and size of the base film 10 is selected and provided according to the kind of a light source to which the optical film 3 is applied.

The matrix layer 20 is formed on the base film 10.

For example, the matrix layer 20 is formed, for example, by forming a liquefied matrix resin formed through the mixture and agitation of a silicone resin and a fluorescent material, etc., and then by applying the liquefied matrix resin on the base film 10.

The matrix layer 20 is formed, for example, by applying and curing the liquefied matrix resin on the base film 10 through use of a screen printing method, a slit coating method and a roll coating method, etc. The matrix layer 20 is dried and cured at a temperature of about 100° C. by using a microwave and an infrared drier, etc., or is cured by adding the curing agent.

Referring to FIG. 10, the viscous layer 30a may be formed on the matrix layer 20 (S103 of FIG. 12).

The viscous layer 30a has an excellent optical transmittance and thermal resistance, and particularly is made of a resin material or/and a silicon material having an excellent viscosity. For example, the viscous layer 30a may be formed of a silicone resin, more preferably, a solvent type silicone resin including toluene.

It is preferable that the viscous layer 30a is formed having a thickness of 20 μm to 100 μm. The viscous layer 30a having such a thickness functions to absorb heat which is generated by the light source and is transferred to the fluorescent material included in the matrix layer 20, thus reducing the degradation of the fluorescent material.

Regarding the viscous layer 30a including volatile toluene, after the viscous layer 30a is formed in a state of B-stage on the matrix layer 20, the viscous layer 30a can be cured by heating to about 10° C. and drying through the use of a microwave, an infrared drier, etc., instead of a separate curing agent. However, there is no limit to a method of curing the viscous layer 30a.

Through the formation of the viscous layer 30a, the optical film 3 according to the embodiment has a small thickness, an improved optical transmittance and its simplified manufacturing process.

Referring to FIG. 11, the optical film 3 according to the embodiment can be provided by forming the release film 60 on the viscous layer 30a (S104 of FIG. 12).

The release film 60 is able to prevent the viscous layer 30a from being exposed to the outside and losing a viscosity. The optical film 3 is adhered to a light source by removing the release film 60.

In the meantime, for the purpose of improving the reliability of the optical film 3, it is possible to perform a post-treatment process of heating the optical film 3 at a temperature of from 50° C. to 100° C. for one hour to twenty four hours.

Figure 13:
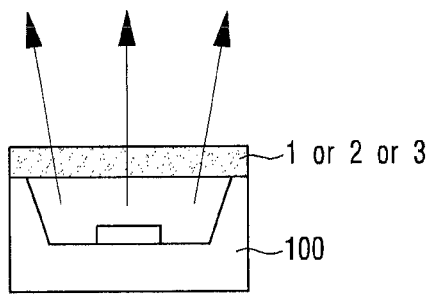
FIG. 13 is a view showing a light emitting device according to the embodiment.

FIG. 13 is a view showing a light emitting device according to the embodiment.

Referring to FIG. 13, the light emitting device includes a light emitting chip 100 and any one of the optical films 1, 2 and 3 which have been described in the first to the third embodiments and include at least one sort of a fluorescent material excited by light emitted from the light emitting chip 100.

The light emitting chip 100 may include, for example, a light emitting diode (hereinafter, referred to as LED). However, there is no limit to the kind of the light emitting chip 100.

The LED may include, for example, red, green, blue or white light emitting diode, each of which emits a red light, a green light, a blue light or a white light respectively.

In general, the LED is a kind of a semiconductor device generating light in accordance with an energy band gap difference between nitride semiconductor layers. Since the LED generates only light having a predetermined wavelength band according to the energy band gap difference, the LED has a low color rendering index (CRI) and is difficult to be applied to generate high-quality light.

Therefore, in the embodiment, a high color rendering index (CRI), for example, a color rendering index (CRI) between 85 and 100 may be obtained by transmitting light emitted from the light emitting chip 100 to the optical films 1, 2 and 3.

In other words, the light transmitting through the optical films 1, 2 and 3 excites at least one kind of the fluorescent material included in the optical film 1 and generates an excited light. The excited light may cause the color rendering index (CRI) of the light emitted from the light emitting chip 100 to be improved.

Meanwhile, the kind and amount of the fluorescent material included in the optical films 1, 2 and 3 may be selected based on a color temperature of the light generated by the light emitting chip 100.

Figures 14, 15:
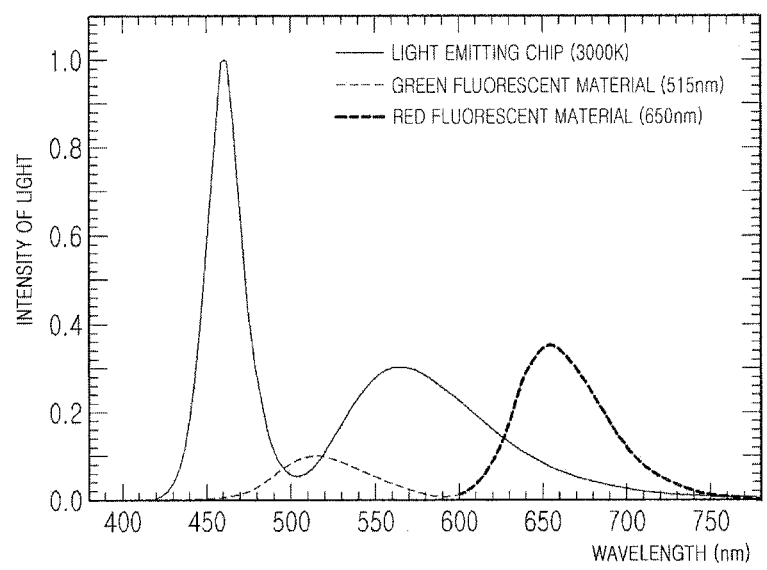
FIG. 14 is a table showing kinds and amounts of fluorescent materials based on color temperatures of the light emitting device.
FIGS. 15 to 20 are graphs showing a color rendering index (CRI) change of the light emitting device.

FIG. 14 is a table showing kinds and amounts of fluorescent materials included in the optical film 1 in accordance with color temperatures of the light emitting chip 100. FIGS. 15 to 20 are graphs showing a color rendering index (CRI) change of the light emitting device when the optical film 1 is applied.

Figure 16:
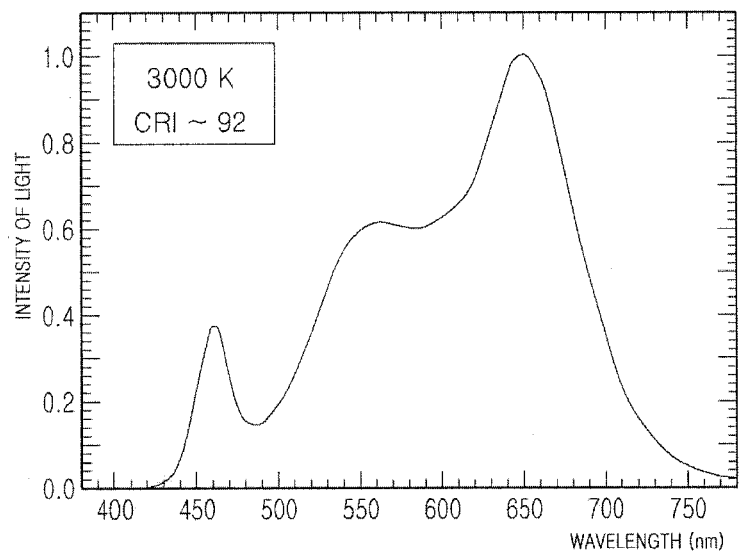

Referring to FIGS. 14, 15 and 16, when the color temperature of the light emitting chip 100 is 3,000 K, with respect to 100 weight percent of the matrix layer 20, the optical film 1 may include 30 to 40 weight percent of the red (R) fluorescent material having a dominant wavelength of 650 nm and 30 to 40 weight percent of the green (G) fluorescent material having a dominant wavelength of 515 nm.

As shown in FIG. 15, regarding the light emitted from the light emitting chip 100, the intensities of the lights at the vicinity of 515 nm and 650 nm are relatively low, and the lights have hereby low color rendering indexes (CRI). Therefore, the optical film 1 includes the red (R) fluorescent material having a dominant wavelength of 650 nm and the green (G) fluorescent material having a dominant wavelength of 515 nm, thereby allowing the light emitting device to have a color rendering index (CRI) of about 92 as shown in FIG. 16.

Figure 17:
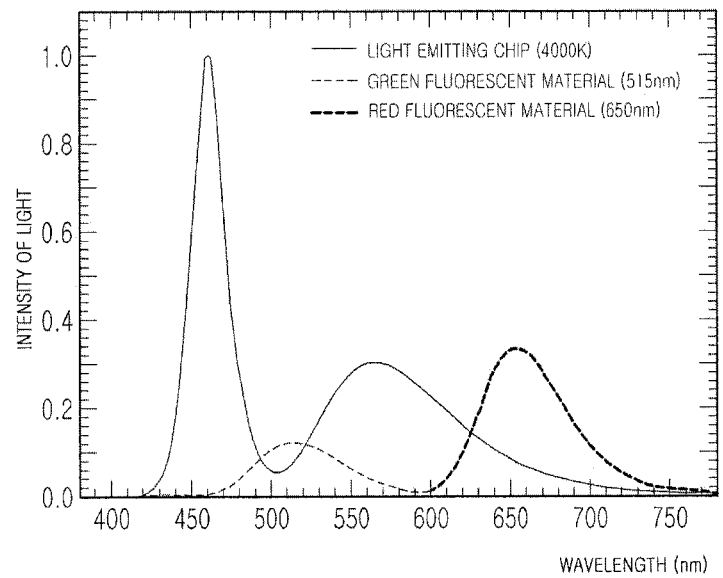
Figure 18:
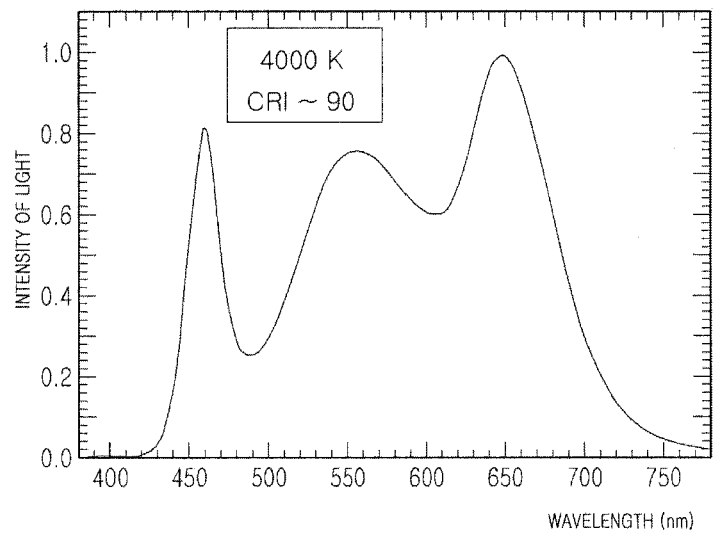

Referring to FIGS. 14, 17 and 18, when the color temperature of the light emitting chip 100 is 4,000 K, with respect to 100 weight percent of the matrix layer 20, the optical film 1 may include 15 to 25 weight percent of the red (R) fluorescent material having a dominant wavelength of 650 nm and 15 to 25 weight percent of the green (G) fluorescent material having a dominant wavelength of 515 nm.

As shown in FIG. 17, regarding the light emitted from the light emitting chip 100, the intensities of the lights at the vicinity of 515 nm and 650 nm are relatively low, and the lights have hereby low color rendering indexes (CRI). Therefore, the optical film 1 includes the red (R) fluorescent material having a dominant wavelength of 650 nm and the green (G) fluorescent material having a dominant wavelength of 515 nm, thereby allowing the light emitting device to have a color rendering index (CRI) of about 90 as shown in FIG. 18.

Figure 19:
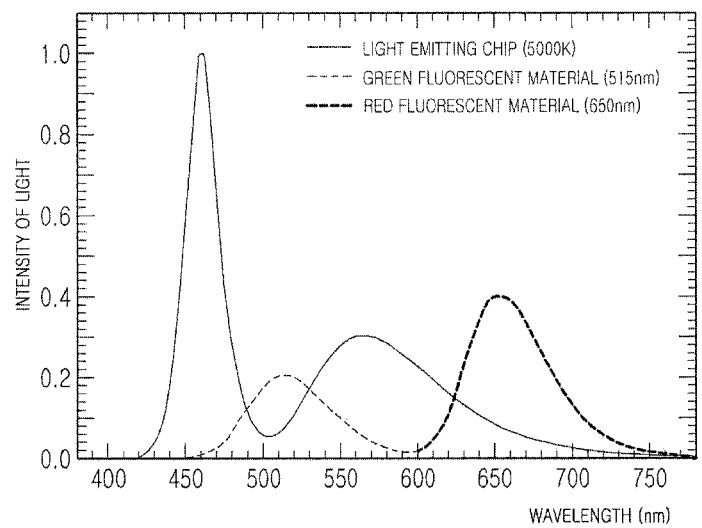
Figure 20:
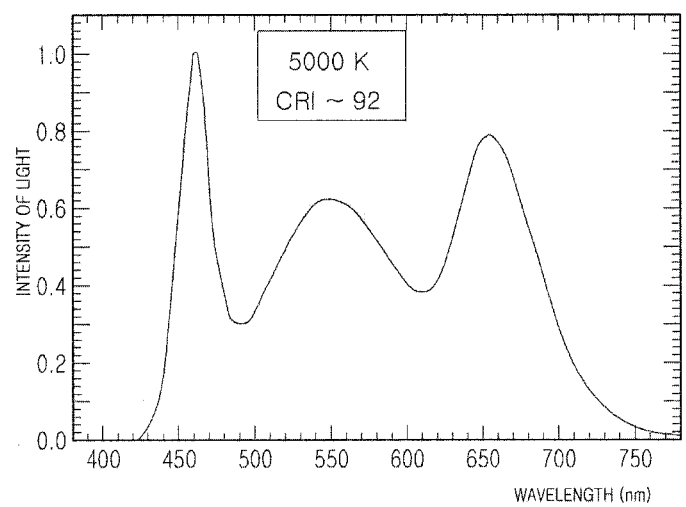

Referring to FIGS. 14, 19 and 20, when the color temperature of the light emitting chip 100 is 5,000 K, with respect to 100 weight percent of the matrix layer 20, the optical film 1 may include 5 to 15 weight percent of the red (R) fluorescent material having a dominant wavelength of 650 nm and 8 to 18 weight percent of the green (G) fluorescent material having a dominant wavelength of 515 nm.

As shown in FIG. 19, regarding the light emitted from the light emitting chip 100, the intensities of the lights at the vicinity of 515 nm and 650 nm are relatively low, and the lights have hereby low color rendering indexes (CRI). Therefore, the optical film 1 includes the red (R) fluorescent material having a dominant wavelength of 650 nm and the green (G) fluorescent material having a dominant wavelength of 515 nm, thereby allowing the light emitting device to have a color rendering index (CRI) of about 92 as shown in FIG. 20.

However, the kind and the amount of the fluorescent material can be changed according to the kind and the color temperature of the light emitting chip 100. There is no limit to the kind and the amount of the fluorescent material.

Figure 21:
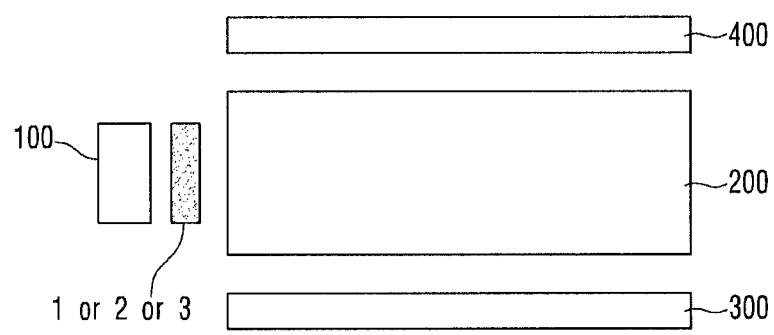
FIG. 21 is a view showing a light unit including the light emitting device.

FIG. 21 is a view showing a light unit including the light emitting device.

Referring to FIG. 21, the light unit includes the light emitting chip 100, the optical films 1, 2 and 3 including at least one sort of a fluorescent material excited by light emitted from the light emitting chip 100, and an optical diffuser diffusing the light passing through the optical films 1, 2 and 3.

Here, the optical diffuser includes a light guide plate 200 allowing the light passing through the optical films 1, 2 and 3 to be used as a surface light source, a diffusion sheet 400 being formed on the light guide plate 200 and diffusing the light, and a reflective sheet 300 being formed under the light guide source 200 and reflecting the light to the light emitting surface of the light guide plate 200.

As shown, the optical films 1, 2 and 3 are formed between the light emitting chip 100 and the light guide plate 200. Here, the optical films 1, 2 and 3 are adhered to the light emitting surface of the light emitting chip 100 or to the light guide plate 200. The object to which the optical films 1, 2 and 3 are adhered is not limited to this. Meanwhile, a method by which the light unit provides light is not limited to an edge method. The light unit is also able to provide light by a top view method.

Since the light unit includes the light emitting chip 100 and the optical films 1, 2 and 3, the light unit is able to provide light having a high color rendering index (CRI) and a high quality. Moreover, through use of the optical films 1, 2 and 3, it is possible to minimize the number of the light emitting chip 100 required for implementing a high color rendering index (CRI).

The features, structures and effects and the like described in the embodiments are included in at least one embodiment of the present invention and are not necessarily limited to one embodiment. Furthermore, the features, structures and effects and the like provided in each embodiment can be combined or modified in other embodiments by those skilled in the art to which the embodiments belong. Therefore, the contents related to the combination and modification should be construed to be included in the scope of the present invention.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical film comprising:
   a base film including a material having optical transmittance and a thermal resistance;
   a matrix layer disposed on the base film and comprising a fluorescent material; and
   a protective layer disposed on the matrix layer and including a material having adhesive property,
   wherein the protective layer has an optical transmittance over 80% and comprises a silicone resin having an adhesive strength.

2. The optical film of claim 1, wherein the matrix layer comprises a silicone resin.

3. The optical film of claim 1, wherein a thickness of the matrix layer is between about 20 μm and about 500 μm.

4. The optical film of claim 1, wherein the fluorescent material comprises at least one of a silicate based fluorescent material, a sulfide based fluorescent material, a YAG based fluorescent material and/or a TAG based fluorescent material.

5. The optical film of claim 1, wherein the protective layer comprises a resin material and the silicon material.

6. The optical film of claim 1, the optical film comprises at least one layer of a protective film, an adhesive member and/or a release film on the protective layer.

7. The optical file of claim 1, further comprising an adhesive member disposed on the protective layer, wherein the adhesive member includes:
a body layer;
a first adhesive layer disposed on the body layer; and
a second adhesive layer disposed under the body layer.

8. The optical film of claim 1, further comprising:
a protective film disposed on the protective layer to protect the matrix layer;
an adhesive member disposed on the protective film; and
a release film disposed on the adhesive member.

9. An optical film comprising:
a base film including a material having optical transmittance and a thermal resistance;
a matrix layer disposed on the base film and comprising a fluorescent material; and
a protective layer disposed on the matrix layer and including a material having adhesive property,
wherein the protective layer is a viscous layer.

10. The optical film of claim 9, wherein an optical transmittance of the viscous layer is at least 90% and comprising toluene.

11. An optical film comprising:
a base film having a thickness between about 10 μm and about 500 μm;
a matrix layer disposed on the base film and comprising a fluorescent material and having a thickness between about 20 μm and about 500 μm; and
a protective layer having an optical transmittance on about 80% and/or a viscosity between about 2,000 cp and about 10,000 cp disposed on the matrix layer.

12. A light emitting device comprising:
a light emitting chip; and
an optical film comprising at least one sort of a fluorescent material excited by light emitted from the light emitting chip, wherein light passing through the optical film has a color rendering index (CRI) between 85 and 100.

13. The light emitting device of claim 12, wherein the optical film comprises:
a base film;
a matrix layer placed on the base film; and
a protective layer placed on the matrix layer, wherein the matrix layer comprises a fluorescent material.

14. The light emitting device of claim 13, wherein the matrix layer comprises a red fluorescent material and a green fluorescent material.

15. The light emitting device of claim 14, wherein the red fluorescent material has a dominant wavelength of 650 nm and the green fluorescent material has a dominant wavelength of 515 nm.

16. The light emitting device of claim 14, wherein, when a color temperature of the light emitting chip is 3,000 K, with respect to 100 weight percent of the matrix layer, 30 to 40 weight percent of the red fluorescent material and 30 to 40 weight percent of the green fluorescent material are comprised in the optical film.

17. The light emitting device of claim 14, wherein, when a color temperature of the light emitting chip is 4,000 K, with respect to 100 weight percent of the matrix layer, 15 to 25 weight percent of the red fluorescent material and 15 to 25 weight percent of the green fluorescent material are comprised in the optical film.

18. The light emitting device of claim 14, wherein, when a color temperature of the light emitting chip is 5,000 K, with respect to 100 weight percent of the matrix layer, 5 to 15 weight percent of the red fluorescent material and 8 to 18 weight percent of the green fluorescent material are comprised in the optical film.

19. The light emitting device of claim 12, wherein the optical film comprises:
a base film;
a matrix layer being formed on the base film and comprising a fluorescent material; and
a viscous layer having a viscosity between 2,000 cp and 10,000 cp on the matrix layer.

20. The light emitting device of claim 12, wherein the viscous layer comprises a silicone resin comprising toluene.

21. The light emitting device of claim 12, wherein an optical transmittance of the viscous layer is at least 7%.

* * * * *